US012746976B2

(12) United States Patent
Focke et al.

(10) Patent No.: US 12,746,976 B2
(45) Date of Patent: Sep. 29, 2026

(54) SPRING SUPPORT FOR A MOTOR VEHICLE

(71) Applicant: Bayerische Motoren Werke Aktiengesellschaft, Munich (DE)

(72) Inventors: Lars Focke, Hallbergmoos (DE); Richard Gralka, Munich (DE); Michael Hainzinger, Volkenschwand (DE); Matthias Neuhauser, Munich (DE); Johannes Pauli, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 149 days.

(21) Appl. No.: 18/870,787

(22) PCT Filed: Jul. 4, 2023

(86) PCT No.: PCT/EP2023/068306
§ 371 (c)(1),
(2) Date: Dec. 2, 2024

(87) PCT Pub. No.: WO2024/041788
PCT Pub. Date: Feb. 29, 2024

(65) Prior Publication Data
US 2026/0249925 A1 Aug. 27, 2026

(30) Foreign Application Priority Data
Aug. 25, 2022 (DE) ..................... 10 2022 121 455.9

(51) Int. Cl.
*B62D 25/08* (2006.01)
*B60G 11/00* (2006.01)

(52) U.S. Cl.
CPC ............ *B62D 25/088* (2013.01); *B60G 11/00* (2013.01); *B60G 2204/12* (2013.01)

(58) Field of Classification Search
CPC .................................................... B62D 25/088
See application file for complete search history.

(56) References Cited

U.S. PATENT DOCUMENTS 7,770,964 B2 * 8/2010 Herntier ............... B62D 25/088 296/192
8,708,403 B2 * 4/2014 Herntier ............... B62D 25/088 296/203.02

(Continued)

FOREIGN PATENT DOCUMENTS

CN 120645610 A * 9/2025 ........... B60G 13/003
CN 120645611 A * 9/2025 ........... B60G 13/003

(Continued)

OTHER PUBLICATIONS

International Search Report (PCT/ISA/210) issued in PCT Application No. PCT/EP2023/068306 dated Oct. 13, 2023 with English translation (4 pages).

(Continued)

*Primary Examiner* — Nicole T Verley
(74) *Attorney, Agent, or Firm* — Crowell & Moring LLP

(57) ABSTRACT

A spring support for a motor vehicle has a lower flange in a motor vehicle vertical direction for fastening the spring support to an engine support extending in a front-end structure of the motor vehicle along the motor vehicle longitudinal direction, an upper flange in a motor vehicle vertical direction for fastening the spring support to a longitudinal member which extends in a front-end structure of the motor vehicle along the motor vehicle longitudinal direction and which is arranged above the engine support in the motor vehicle vertical direction, and a basic body which connects the lower and the upper flange and is intended to receive a spring strut for a front wheel of the motor vehicle. The basic body extends in at least one subregion in the motor vehicle longitudinal direction upwards in the motor vehicle vertical direction starting from the lower flange without kinking in a motor vehicle width direction.

10 Claims, 1 Drawing Sheet

(56) References Cited

U.S. PATENT DOCUMENTS

| | | | |
|---|---|---|---|
| 2016/0068190 A1 | 3/2016 | Muehlhausen et al. |
| 2016/0129747 A1 | 5/2016 | Mildner et al. |
| 2017/0008570 A1 | 1/2017 | Mildner et al. |
| 2022/0041217 A1 | 2/2022 | Schmidt et al. |

FOREIGN PATENT DOCUMENTS

| | | | | | |
|---|---|---|---|---|---|
| CN | 120942427 | A | * | 11/2025 | ........... B62D 21/155 |
| DE | 10 2011 085 823 | A1 | | 5/2012 | |
| DE | 10 2013 209 099 | A1 | | 11/2014 | |
| DE | 10 2014 104 838 | A1 | | 10/2015 | |
| DE | 10 2014 015 539 | A1 | | 4/2016 | |
| DE | 10 2015 008 728 | A1 | | 1/2017 | |
| DE | 10 2019 206 041 | A1 | | 10/2020 | |
| EP | 1925534 | A2 | * | 5/2008 | ........... B62D 25/088 |
| EP | 3 037 326 | A1 | | 6/2016 | |
| JP | 2013173485 | A | * | 9/2013 | ........... B62D 25/088 |
| JP | 5529225 | B2 | * | 6/2014 | |
| WO | WO-2013150806 | A1 | * | 10/2013 | ............. B62D 25/14 |
| WO | WO 2017/175585 | A1 | | 10/2017 | |

OTHER PUBLICATIONS

German-language Written Opinion (PCT/ISA/237) issued in PCT Application No. PCT/EP2023/068306 dated Oct. 13, 2023 with English translation (7 pages).
German-language Office Action issued in German Application No. 10 2022 121 455.9 dated Apr. 24, 2023 (7 pages).

* cited by examiner

SPRING SUPPORT FOR A MOTOR VEHICLE

BACKGROUND AND SUMMARY

The present invention relates to a spring support for a motor vehicle, to a front end structure of a motor vehicle having the spring support, and to a motor vehicle having the front end structure.

Spring supports for motor vehicles of the type in question are known from the prior art.

In this context, DE 10 2011 085 823 A1 relates to an engine compartment structure comprising a side part of an engine compartment, a base part, which extends from the side part to the vehicle inner side, a suspension strut receptacle, which extends upward from the base part, and a bracket, which encloses a corner portion formed by the side part, the base part and the front part of the suspension strut receptacle and to which an engine suspension can be connected. The bracket has, along its edge, a first, second, third and fourth flange. Each of these flanges is respectively connected in an L-shaped manner to the adjacent other flange at a position from at least one pair of opposing comers of the substantially rectangular shape as seen from above.

DE 10 2019 206 041 A1 relates to a bodywork front end structure for a two-track vehicle, having an A-pillar, from which an upper wheel arch longitudinal carrier projects in the vehicle longitudinal direction toward the front of the vehicle and from which a lower bodywork longitudinal carrier, which is offset toward the vehicle interior with respect to the upper wheel arch longitudinal carrier, projects in the vehicle longitudinal direction toward the front of the vehicle, wherein a transverse assembly extends in the vehicle transverse direction, and in an inner corner region between the transverse assembly and the upper wheel arch longitudinal carrier a suspension strut dome is arranged, to which a wheel arch sheet metal part is connected, which wheel arch sheet metal part delimits the wheel arch interior, in the vehicle longitudinal direction toward the front of the vehicle and in the vehicle height direction toward the bottom of the vehicle, and connects the lower bodywork longitudinal carrier to the upper wheel arch longitudinal carrier, wherein, in a head-on collision, in particular with slight lateral overlap, the suspension strut dome is subjected to a collision force in the vehicle longitudinal direction. The bodywork front end structure has a sheet metal tension strip, which connects the suspension strut dome to the lower bodywork longitudinal carrier in a force-transmitting manner. In the event of a head-on collision, the sheet metal tension strip provides a load path via which a tensile force counteracting the collision force acts on the suspension strut dome.

WO 2017/175585 A1 describes a sheet made from an aluminum alloy, which is drawn or bent to form a first intermediate shaped body of a suspension tower. The first intermediate shaped body is drawn to form a second intermediate shaped body, which has a shape approaching that of the suspension tower. The second intermediate shaped body is finally shaped into the shape of the suspension tower. The finished suspension tower is connected to a front longitudinal carrier and an upper longitudinal carrier.

DE 10 2013 209 099 A1 describes a spring support for a motor vehicle, comprising a suspension strut cup made from a metallic material and three shell components made from a fiber composite material. The suspension strut cup is incorporated in the shell components in such a manner that a first shell component spans an arc from an outer side of an engine carrier to an underside of a supporting carrier, and the suspension strut cup is fastened, by way of its edge, from below to the first shell component. A second shell component connects a top side of the supporting carrier, a top side of the first shell component and an outer top side of the suspension strut cup to one another, and a third shell component is fastened to an inner side of the engine carrier and a top side of an engine carrier and to an inner side of the first shell component and an inner top side of the suspension strut cup.

DE 10 2014 015 539 A1 describes a carrier structure component for connecting a suspension strut to a vehicle bodywork having at least one connecting portion for connecting to a vehicle bodywork and having at least one flange portion, which is designed for fastening a suspension strut receptacle on which a suspension strut is mounted.

Against the background of this prior art, the object of the present disclosure is to provide a device that is suitable for enhancing the prior art.

The object is achieved by the features of the independent claim. The subclaims contain optional developments of the disclosure.

Accordingly, the object is achieved by a spring support for a motor vehicle. The spring support can also be referred to as suspension strut receptacle or suspension strut cup.

The spring support comprises a lower, in a motor vehicle height direction, flange for fastening the spring support to an engine carrier, which extends in a front end structure of the motor vehicle along the motor vehicle longitudinal direction.

The spring support comprises an upper, in a motor vehicle height direction, flange for fastening the spring support to a longitudinal carrier, which extends in a front end structure of the motor vehicle along the motor vehicle longitudinal direction and is arranged above the engine carrier in the motor vehicle height direction.

In order to connect the spring support to the bodywork components, a spot welding process, for example, can be used.

The spring support comprises a main body, which connects the lower and the upper flange, for receiving a suspension strut for a front wheel of the motor vehicle.

The main body extends in at least one partial region in the motor vehicle longitudinal direction, from the lower flange without kinking in a motor vehicle width direction and upward in the motor vehicle height direction.

In other words, the partial region of the main body and the lower flange can be arranged in the same plane, with the result that a normal vector perpendicular to the partial region runs parallel to a normal vector perpendicular to the lower flange.

This means that the flange surface toward the engine carrier is included in the free spring support surface referred to as main body. This ensures an optimal load transfer. An optimal development of the shape at this point may be determined and implemented in the design through the generative development method of numerical free-form optimization.

Avoiding kinking of the spring support in the transition region between the lower flange and the main body accordingly enables functional advantages in the architecture configuration, for example in terms of operational strength and driving dynamics, to be achieved. In contrast to conventional front end structures, this eliminates the use of an additional sheet metal structure (known as a patch) for effecting such functional improvements. In particular, service life and stiffness can be increased by the proposed configuration of the spring support, with this having substantially no impact on weight.

Possible developments of the above-described spring support are explained in detail below.

The spring support can be designed as a sheet metal component. The spring support may be designed as a two-part sheet metal component.

The sheet metal component can have, at least in the region of the main body, a wall thickness of between 0.7 mm and 3.0 mm, optionally 1.6 mm. This allows not only stiffness requirements but also (vibro) acoustic requirements to be met.

The partial region has a U-shaped design. That means that the partial region tapers from bottom to top, this being possible without the formation of edges.

The main body can extend from the U-shaped partial region upward in the motor vehicle height direction and outward in the motor vehicle width direction in a dome-like manner toward the upper flange. This enables the main body to receive the spring support in the dome-like region, which is outwardly open in the motor vehicle width direction, and to enclose the spring support at the front and rear in the motor vehicle longitudinal direction and inwardly in the motor vehicle width direction. This dome-like region can have a U-shaped design in a cross section in a plane to which the motor vehicle height direction is perpendicular.

The partial region and the lower flange can be substantially arranged in a plane defined by the motor vehicle longitudinal direction and the motor vehicle height direction. In other words, the motor vehicle width direction can be perpendicular both to the flange and to the partial region.

The partial region can be arranged entirely above the engine carrier in the motor vehicle height direction.

Furthermore provided is a front end structure of a motor vehicle. This comprises the above-described spring support, and an engine carrier, which extends along the motor vehicle longitudinal direction and to which the lower flange of the spring support is fastened, and a longitudinal carrier, which extends along the motor vehicle longitudinal direction, is arranged above the engine carrier in the motor vehicle height direction, and to which the upper flange of the spring support is fastened.

The spring support can have a spring support upper part, which upwardly closes off the spring support in a motor vehicle height direction, for fastening a suspension strut for a front wheel of the motor vehicle. This component can also be referred to as dome bearing.

The above description with reference to the spring support also applies, mutatis mutandis, to the front end structure, and vice versa.

Furthermore provided is a motor vehicle having the above-described front end structure.

The motor vehicle can have a drive assembly fastened to the engine carrier, optionally having a combustion engine, an electric motor and/or a fuel cell.

The motor vehicle can be a passenger motor vehicle, in particular an automobile and/or a utility vehicle.

The above description with reference to the spring support and the front end structure also applies, mutatis mutandis, to the motor vehicle, and vice versa.

An embodiment is described below with reference to FIGS. 1 and 2.

DETAILED DESCRIPTION OF THE DRAWINGS

Figure 2:
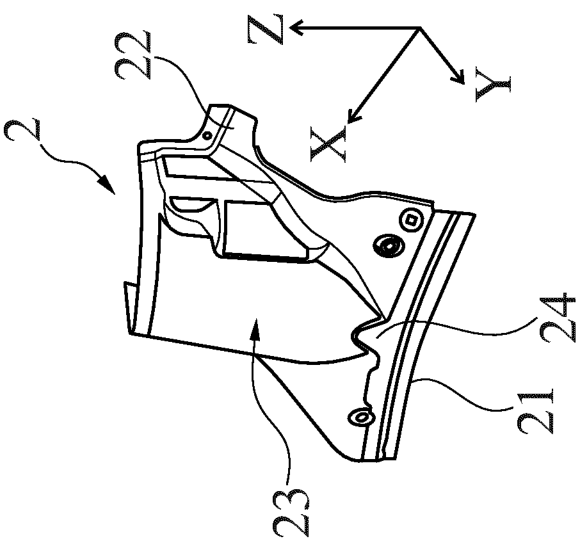
FIG. 2 is a schematic and perspective view of the spring support in isolation.
Figure 1:
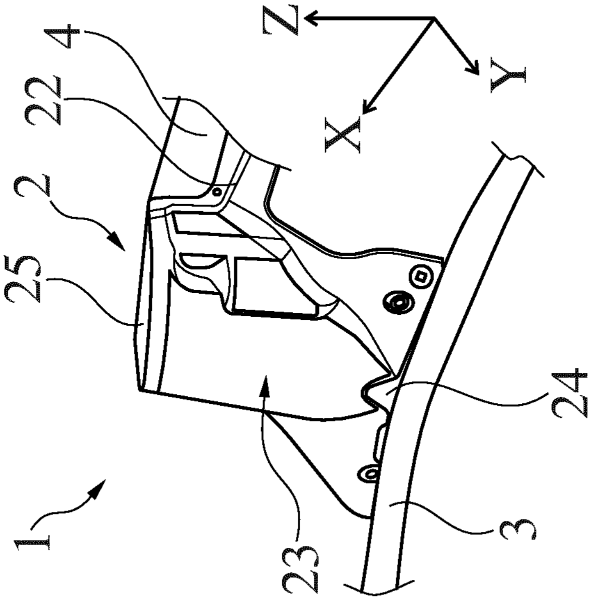
FIG. 1 is a schematic and perspective view of a front end structure of a motor vehicle having a spring support according to the disclosure.

FIGS. 1 and 2 each illustrate a Cartesian coordinate system, the X axis of which runs along a motor vehicle longitudinal direction X, the Y axis of which runs along a motor vehicle width direction Y and the Z axis of which runs along a motor vehicle height direction. All of the axes each enclose a 90° angle with one another. The motor vehicle longitudinal direction X and the motor vehicle width direction Y define a substantially horizontal plane, to which the motor vehicle height direction Z, which runs substantially parallel to a vertical, is perpendicular. The motor vehicle longitudinal direction X runs from a front to a rear of the motor vehicle, which is not illustrated in more detail, and thus counter to the main direction of travel thereof.

The front end structure 1 has, in addition to the spring support 2, an engine carrier 3, which extends in the front end structure 1 along the motor vehicle longitudinal direction X, and a longitudinal carrier 4, which extends in the front end structure 1 likewise along the motor vehicle longitudinal direction X and is arranged above the engine carrier 3 in the motor vehicle height direction Z.

The spring support 2 comprises, as can be seen in particular from FIG. 2, a lower, in the motor vehicle height direction Z, flange 21 for fastening the spring support 2 to the engine carrier 3, and an upper, in the motor vehicle height direction Z, flange 22 for fastening the spring support 2 to the longitudinal carrier 4.

In the state illustrated in FIG. 1, the spring support is connected or fastened to the two carriers 3, 4 via the respective flange 21, 22.

The spring support 2 designed as a sheet metal component furthermore comprises a main body 23, which connects the lower and the upper flange 21, 22, for receiving a suspension strut (not illustrated) for a front wheel (likewise not illustrated) of the motor vehicle, wherein the spring support has a wall thickness of between 0.7 mm and 3.0 mm, optionally 1.6 mm. A spring support upper part 25 for fastening the suspension strut upwardly closes off the spring support in the motor vehicle height direction.

As can be seen both from FIG. 1 and from FIG. 2, the main body 23 extends in a partial region 24 in the motor vehicle longitudinal direction X, from the lower flange 21 without kinking in a motor vehicle width direction Y and upward in the motor vehicle height direction Z, i.e., in the present case, the partial region 24 and the lower flange 21 are substantially arranged in a plane defined by the motor vehicle longitudinal direction X and the motor vehicle height direction Z. The partial region 24 is arranged entirely above the engine carrier 3 as an extension of the lower flange 21. As seen from the motor vehicle width direction Y, this partial region 24, which extends the lower flange upward in the free surface of the main body 23, has a U-shaped design. The main body 23 extends from the U-shaped partial region 24 upward in the motor vehicle height direction Z in a dome-like manner and outward in the motor vehicle width direction Y toward the upper flange 22 and toward the spring support upper part 25. As seen from above from a motor vehicle height direction Z, the spring support 2 thus substantially has an upwardly widening U-shaped cross section in the region above the partial region 24.

As a result of this partial region 24 that can be configured to be variable in size, as already described in the introduction, the surface of the lower flange 21 is included in the free spring support surface or main surface 23. This ensures an optimal load transfer. The optimal development of the shape at this point is determined and implemented in the design through the generative development method of numerical free-form optimization.

LIST OF REFERENCE SIGNS

1 front end structure
2 spring support
21 lower flange
22 upper flange
23 main body
24 partial region
25 spring support upper part
3 longitudinal engine carrier
4 upper longitudinal carrier
X motor vehicle longitudinal direction
Y motor vehicle width direction
Z motor vehicle height direction

The invention claimed is:

1. A spring support for a motor vehicle, comprising:
a lower flange in a motor vehicle height direction for fastening the spring support to an engine carrier, which engine carrier extends in a front end structure of the motor vehicle along a motor vehicle longitudinal direction;
an upper flange in a motor vehicle height direction for fastening the spring support to a longitudinal carrier, which longitudinal carrier extends in the front end structure of the motor vehicle along the motor vehicle longitudinal direction and which is arranged above the engine carrier in the motor vehicle height direction; and
a main body connecting the lower flange and the upper flange for receiving a suspension strut for a front wheel of the motor vehicle,
wherein the main body extends in at least one partial region in the motor vehicle longitudinal direction, from the lower flange without kinking in a motor vehicle width direction and upward in the motor vehicle height direction, and
wherein the partial region has a U-shaped configuration that tapers from bottom to top.

2. The spring support according to claim 1, wherein the spring support is a sheet metal component.

3. The spring support according to claim 2, wherein
the sheet metal component has, at least in the region of the main body, a wall thickness of between 0.7 mm and 3.0 mm.

4. The spring support according to claim 3, wherein
the sheet metal component has, at least in the region of the main body, a wall thickness of 1.6 mm.

5. The spring support according to claim 1, wherein
the main body extends from the U-shaped partial region upward in the motor vehicle height direction and outward in the motor vehicle width direction in a dome-shaped manner toward the upper flange.

6. The spring support according to claim 1, wherein
the partial region and the lower flange are substantially arranged in a plane defined by the motor vehicle longitudinal direction and the motor vehicle height direction.

7. The spring support according to claim 1, wherein
the partial region is arranged entirely above the engine carrier in the motor vehicle height direction.

8. A front end structure of a motor vehicle, comprising:
a spring support according to claim 1;
the engine carrier, which extends along the motor vehicle longitudinal direction and to which the lower flange of the spring support is fastened; and
the longitudinal carrier, which extends along the motor vehicle longitudinal direction, is arranged above the engine carrier in the motor vehicle height direction, and to which the upper flange of the spring support is fastened.

9. The front end structure according to claim 8, wherein
the spring support has a spring support upper part, which upwardly closes off the spring support in the motor vehicle height direction, for fastening a suspension strut for a front wheel of the motor vehicle.

10. A motor vehicle comprising a front end structure according to claim 8.

* * * * *